United States Patent [19]
Piazza

[11] 3,830,331
[45] Aug. 20, 1974

[54] AUTOMOTIVE INERTIA BATTERY DISCONNECT DEVICE

[76] Inventor: James Thomas Piazza, 1377 Cain Rd., Angola, N.Y. 14046

[22] Filed: Mar. 8, 1973

[21] Appl. No.: 339,172

[52] U.S. Cl. ............... 180/103, 339/45 R, 339/258
[51] Int. Cl. ............................................ B60r 21/00
[58] Field of Search ......... 180/103, 96, 105 E, 82.3; 339/45 R, 213 R, 213 T, 252 P; 200/51.12, 61.45, 61.53

[56] References Cited
UNITED STATES PATENTS

| | | | |
|---|---|---|---|
| 1,323,077 | 11/1919 | Lorquet | 339/45 R |
| 2,142,369 | 1/1939 | Muller | 180/103 X |
| 2,190,934 | 2/1940 | Courtney | 180/96 X |
| 3,031,641 | 4/1962 | Camzi | 339/252 P X |
| 3,213,226 | 10/1965 | Konderla | 180/103 X |
| 3,243,537 | 3/1966 | Jezek | 180/103 X |
| 3,735,072 | 5/1973 | Six | 200/61.45 R |

FOREIGN PATENTS OR APPLICATIONS

| 403,087 | 12/1933 | Great Britain | 200/61.53 |

*Primary Examiner*—Leo Friaglia
*Assistant Examiner*—Terrance L. Siemens

[57] ABSTRACT

A collision actuated circuit breaking device for automobiles and the like. This device consists primarily of a slotted male plug which secured to the automobile engine block, the plug being received within a female sleeve extending from a lead cylinder carrying an electric cable, the combination serving to separate so as to break an electrical circuit when collision of the vehicle occurs.

4 Claims, 3 Drawing Figures

PATENTED AUG 20 1974 3,830,331

AUTOMOTIVE INERTIA BATTERY DISCONNECT DEVICE

This invention relates to inertia operated devices, and more particularly to an automotive inertia battery disconnect device.

It is therefore the principal object of this invention to provide an inertia battery disconnect device which when the vehicle it is installed upon collides with an object or another vehicle, the device will separate by inertia means, thus opening the circuit it is secured within.

Another object of this invention is to provide a battery disconnect device of the type described which will include a slotted male plug member which is secured by bolt fastener means to the engine block, the male member being received within a female sleeve member, also slotted, so as to easy disconnect when a collision occurs.

Still another object of this invention is to provide a disconnect device of the type described which will have the body of the female member made of lead so as to provide the necessary weight to be activated by the collision and thus separate the male and female member, the result being that the circuit the device is carried in, will immediately open so as to provide the maximum amount of safety against fire occurring.

Yet another object of this invention is to provide a disconnect device of the type described which will be adaptable to automotive vehicles, aircraft, seacraft and other vehicles, the device being activated by the inertial force created by collision.

A further object of this invention is to provide a disconnect device of the type described which may be adapted to many electrical circuits within a vehicle, so as to effect immediate opening of a circuit or circuits.

It shall be noted that the device can be located in an easily accessible position under the hood so that it can be used as a convenient means for manually disconnecting the electrical circuit quickly and when ever desired.

An even further object of this invention is to provide a device of the type described which will have a rubber sleeve so as to protect the female portion from grounding out when a disconnect occurs.

Other objects of the invention are to provide a battery disconnect device which will be simple in design, inexpensive to manufacture, rugged in construction, easy to use and efficient in operation.

These and other objects will be readily evident upon a study of the following specification and the accompanying drawing wherein.

Figure 1:
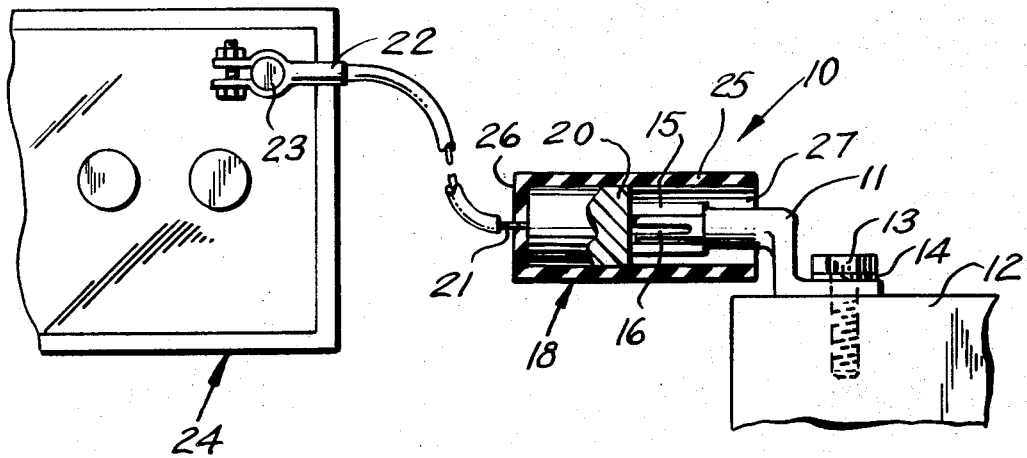
FIG. 1 is a side view of the present invention shown partly in section and secured to an engine block and a battery.
Figure 2:
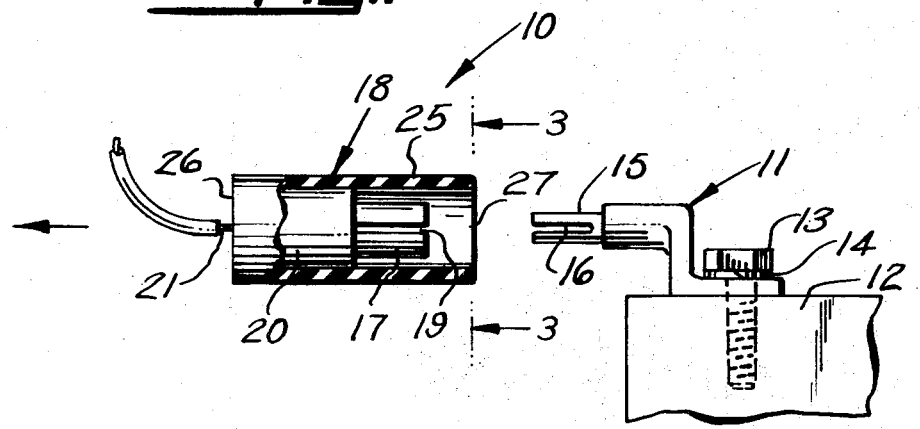
FIG. 2 is a fragmentary view of FIG. 1 showing the device separated so as to illustrate the inertia force of a collision, separating the male plug from the female sleeve portion, the device being shown in elevation.
Figure 3:
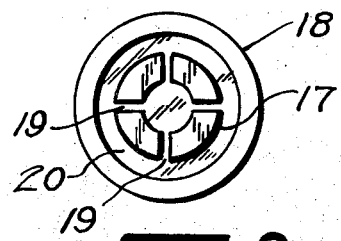
FIG. 3 is an enlarged view taken along the line 3—3 of FIG. 2.

According to this invention, an inertia operated battery disconnect device 10 is shown to include a Z-shaped configurated male plug 11 made of a suitable electrically conductive metal. One end of male plug 11 is secured to the engine block 12 of an automotive vehicle (not shown). Plug 11 is secured to block 12 by means of a bolt fastener 13 having a lock washer 14 thereon for rendering it secure to block 12. The opposite end of male plug 11 consists of a prong 15 having equally spaced apart openings 16 so as to enable it to be freely engaged within the extending sleeve 17 of female member 18. The sleeve 17 portion of female member 18 is also of a suitable metal conductor and includes a plurality of slots 19 enabling expansion thereof for slideably and frictionally engaging the male plug 11 while the structure also enables the male plug 11 to be quickly separated from female member 18 due to the force of inertia due to a collision.

The sleeve 17 extends from a lead cylinder 20, the opposite end of lead cylinder 20 having imbedded therein a battery cable 21, the opposite end of which is secured within a typical battery lug 22 fastened onto terminal 23 of battery 24. The entire female member 18 is encased within a rubber sleeve 25, the sleeve 25 having a closed end 26 and an open end 27.

In use, the lead weight cylinder 20 of female member 18 being of such density, will when impact occurs with the vehicle, immediately move forward thus disengaging the sleeve 17 from the prong 15 of the male plug, the result being that circuit to battery 24 will be broken until it is desired to engage the male plug 11 again with female member 18.

It shall be noted that device 10 may be installed in various circuits so as to act as an automatic switch means for opening the circuit during a collision.

What I claim is:

1. In an inertia operated battery disconnect device, comprising a male plug, bolt fastening means carried by said plug for securing it to the engine block, open prong means carried by said plug providing for electrical contact with a metal sleeve of a female member, a lead cylinder carried by said sleeve providing mass weight of such density so as to be acted upon by inertia when a vehicle collides, an electrical cable and lug carried by said female member for electrically securing it to a battery, a rubber sleeve carried by said female member providing insulation means for said female member so as to prevent it from becoming grounded when disengaged from said prong of said device.

2. The combination according to claim 1, wherein said prong of said male plug is provided with opening means so as to enable it to expand or contract for easy entering of said sleeve extending from said lead weight cylinder of said female member, said sleeve of said lead weight cylinder having equally spaced apart openings opening for expansion and contraction, thus enabling good electrical contact with said prong of said male plug when said prong is inserted within said sleeve of said female member.

3. The combination according to claim 2, wherein said lead weight cylinder has embedded in the opposite end, an insulated battery cable having lug means for securement to a terminal of a battery, said lead weight cylinder having such mass and density that it will quickly move away from said male plug so as to open the circuit between the engine block and the battery of the vehicle, the inertia force caused by collision of said vehicle with an object, causing said female member to disengage from said male plug.

4. The combination according to claim 3, wherein, said female member is enclosed and secured by friction means, within said rubber sleeve, said rubber sleeve having an open end for receiving said prong of said male plug and said rubber sleeve having a closed end through which extends said battery cable, said rubber sleeve thus protecting said female member from becoming grounded on some part of the vehicle after separation from said male plug immediately following a collision of said vehicle with an object.

* * * * *